United States Patent [19]
Frezzolini et al.

[11] 3,775,661
[45] Nov. 27, 1973

[54] RECHARGEABLE BATTERY POWER SOURCE WITH GAS-PRESSURE SWITCH

[75] Inventors: James Frezzolini; James J. Crawford, both of Ringwood, N.J.

[73] Assignee: Frezzolini Electronic Inc., Hawthorne, N.J.

[22] Filed: May 23, 1972

[21] Appl. No.: 256,123

[52] U.S. Cl. .................. 320/46, 136/181, 200/83 B
[51] Int. Cl. ...................... H01m 45/04, H02j 7/00
[58] Field of Search ..................... 320/46; 200/83 B; 136/181

[56] References Cited
UNITED STATES PATENTS
3,081,366   3/1963   Belove ........................... 320/46 UX
2,204,101   6/1940   Fumagalli ....................... 320/46 X
3,490,342   1/1970   Reis................................. 200/83 B FOREIGN PATENTS OR APPLICATIONS
863,742   3/1961   Great Britain ................... 200/83 B Primary Examiner—J. D. Miller
Assistant Examiner—Robert J. Hickey
Attorney—Paul Fields

[57] ABSTRACT

The source comprises a battery of the type adapted to produce an increased gaseous pressure when the battery is fully charged such as a nickel-cadmium battery. The battery includes a cylindrical jacket having top and bottom walls and the control device is sealingly connected to the top wall and is adapted to be connected to a battery charging device for controlling the operation of the device to prevent overcharging of the battery per se. The control device includes a housing having a pressure-responsive diaphragm therein which is adapted to move from a first position to a second position in response to the increased gaseous pressure produced by the battery when it is fully charged. A switch is operable between a closed state for energizing the charging device and an open state for deenergizing the charging device. Connecting means is provided for connecting the switch with the diaphragm so that the switch is moved to the open state in response to movement of the diaphragm to the second position. A passage connects the interior of the battery with the diaphragm so that the increased gaseous pressure within the jacket moves the diaphragm from the first to the second position.

3 Claims, 5 Drawing Figures

PATENTED NOV 27 1973　　3,775,661
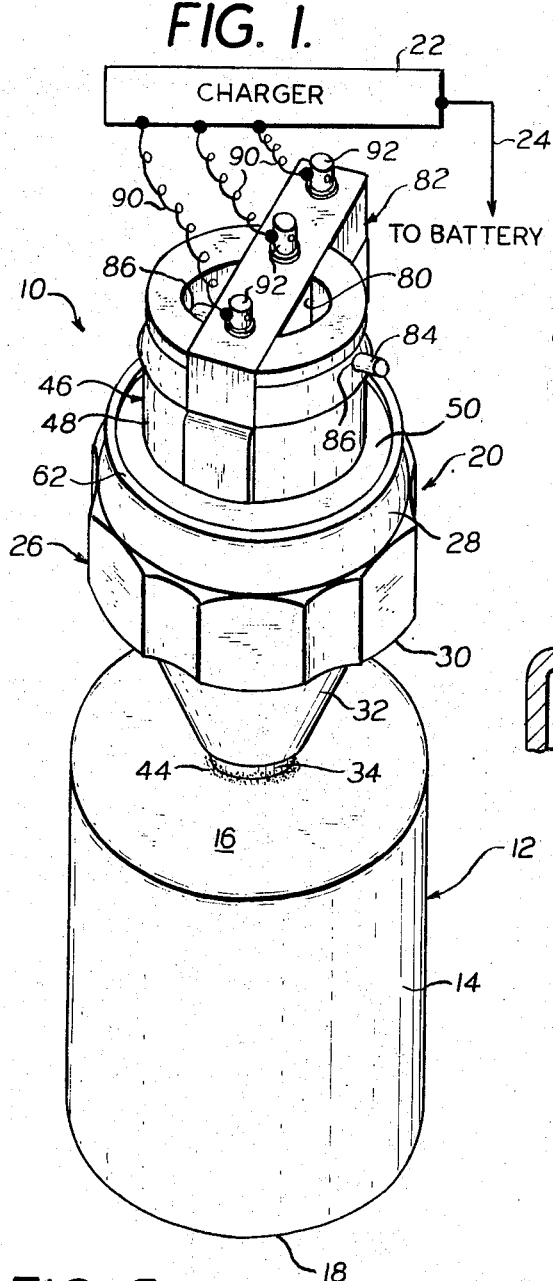
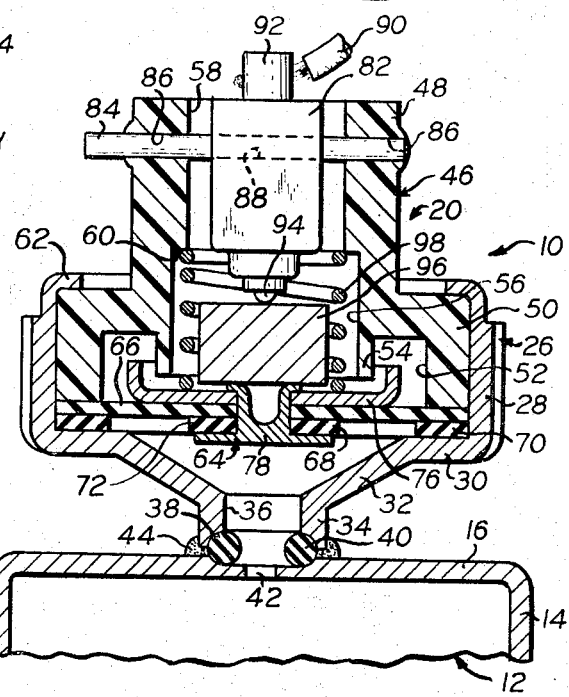
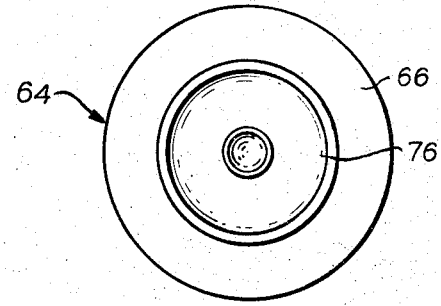
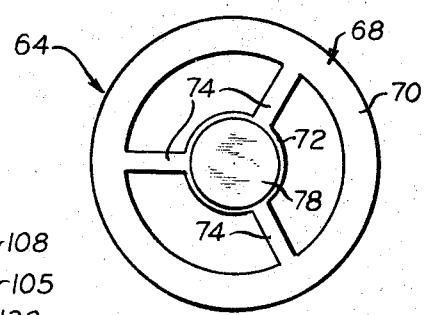
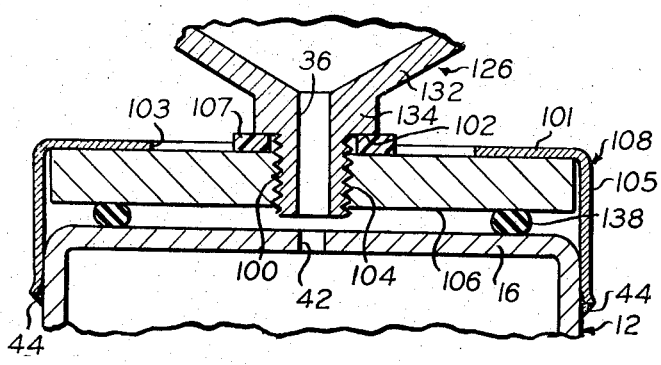

RECHARGEABLE BATTERY POWER SOURCE WITH GAS-PRESSURE SWITCH

This invention relates to a rechargeable battery power source and, more particularly, pertains to a battery power pack in which the possibility of overcharging the battery is eliminated.

Presently, electrically powered portable devices such as flashlights, electric flashguns for cameras, razors and the like are manufactured with an integral power pack or battery power source which includes both a rechargeable battery and a charging circuit. Under normal operation, as the stored energy in the battery begins to decrease, the charging circuit is connected to an external source of energy which supplies the power necessary to charge the battery. Although so-called nickel-cadmium batteries would be ideal as the power pack because of their efficiency and capability, a problem is encountered in charging such batteries.

To be more specific, most power packs of the type under consideration utilize a charging circuit which is adapted to sense some characteristic of the battery such as the potential. Thus, as the potential of the battery increases the charging circuit decreases the energy supply to the battery and finally ceases to supply energy when the battery potential reaches the rated value to prevent overcharging of the battery. However, inherent in the properties of nickel-cadmium batteries is the fact that such batteries have no discernible repetitive voltage characteristics. Hence, sensing the potential of the battery is useless as a means of controlling the charging of the same. Moreover, and of greater importance, is the fact that overcharging of such batteries may result in the battery exploding, thereby endangering persons and property in the vicinity of the battery.

Accordingly, an object of this invention is to provide an improved rechargeable battery power source.

A more specific object of the present invention is to provide a rechargeable battery power source which incorporates nickel-cadmium batteries.

Another object of the invention resides in the novel details of construction which provide a power source of the type described which is efficient and reliable in operation.

A further object of the invention is the provision of a battery power source having a reliable control means for deenergizing a charger when the battery is fully charged.

Accordingly, a rechargeable battery power source constructed in accordance with the present invention comprises a battery of the type adapted to produce an increased gaseous pressure when the battery is fully charged. The battery includes a cylindrical jacket having a top and bottom wall and control means is sealingly connected to the top wall and is adapted to be connected to a battery charging device for controlling the operation of said device to prevent overcharging of the battery. The control means comprises a housing having a movable pressure-responsive diaphragm therein. Additionally, a switch is provided which is operable between a closed state for energizing the charging device and an open state for deenergizing the charging device. Connecting means connects the switch with the diaphragm and is adapted to move the switch to the open state in response to movement of the diaphragm in a first direction. A passage connects the interior of the battery with the diaphragm so that the increased gaseous pressure within the jacket moves the diaphragm in the first direction to cause deenergization of the charging device thereby preventing overcharging of the battery.

Other features and advantages of the present invention will become more apparent from a consideration of the following detailed description when taken in conjunction with the accompanying drawing, in which:

FIG. 1 is an enlarged perspective view of a power source constructed in accordance with the present invention;

FIG. 2 is a sectional view of the control device forming a part of the power source shown in FIG. 1;

FIG. 3 is a top plan view of the diaphragm in the control device of FIG. 2;

FIG. 4 is a bottom plan view thereof; and

FIG. 5 is a partial sectional view of a modified embodiment of the control device.

Before describing the rechargeable battery power source of the present invention in detail, it is believed that a discussion of the characteristics of nickel-cadmium battery cells will facilitate an understanding and an appreciation of the present invention. Accordingly, as noted hereinabove, a nickel-cadmium or so-called Nicad battery cell has no discernible repetitive voltage characteristics. However, at the end of the charging period of a nickel-cadmium battery, (i.e., when the battery is fully charged) a gas is produced within the battery. This gas, which is oxygen, increases the gaseous pressure within the jacket enclosing the chemical elements of the battery. As the energy within the battery is used by an external device, the oxygen recombines with the elements within the battery so that the gaseous pressure decreases. If, however, the battery is overcharged, the gaseous pressure may increase to such magnitudes as to cause the battery to explode. The present invention makes use of the fact that the gaseous pressure within the battery increases after the battery is fully charged, thereby to prevent overcharging of the battery.

More specifically, a rechargeable battery power source constructed in accordance with the present invention is designated generally by the reference numeral 10 in the figures and includes a battery 12. The battery 12 is of the nickel-cadmium or Nicad type and includes a cylindrical metal jacket 14 having a top wall 16 and a bottom wall 18. As noted hereinabove, the battery 12 will produce an increased gaseous pressure within the jacket 14 when the battery is fully charged.

Mounted on the top wall 16 of the battery 14 is a control device designated generally by the reference numeral 20 and shown in detail in FIGS. 1 and 2. The control device 20, as noted in greater detail hereinbelow, is connected to a battery charger or charging device 22 and is adapted to control the operation of the charger 22 which supplies charging energy to the battery 12 via a lead 24. The charger 22 may be any conventional battery charging circuit. The control device 20 normally causes the charger 22 to be energized thereby to charge the battery 12. However, when the battery 12 is fully charged the control device 20 senses the increased gaseous pressure within the battery corresponding to full charge of the battery and operates to de-energize the charger 22 to prevent further charging of the battery.

In particular, the control device 20 includes a support member 26 which may be fabricated from a metal such as steel or the like. The support member 26 includes a multi-faceted-peripheral wall 28 and a bottom wall 30 having a portion 32 which slopes downwardly toward the center of the support member and a depending circular flange 34 connected to the portion 32. The flange 34 includes a through bore 36 the bottom edge of which includes an enlarged recess 38. Received within the recess 38 is an O-ring or gasket 40 which may be fabricated from rubber or the like.

As shown in FIG. 2, the top wall 16 of the battery 12 is provided with a vent opening 42 which communicates with the interior of the battery. The support member 26 is positioned on the top wall of the battery so that the bore 36 communicates with the vent opening 42. The diameter of the O-ring 40 is chosen to be slightly larger than the recess 38 so that the O-ring 40 will be compressed between the top wall 16 and the walls forming the recess 38 in the support member 28 whereby the O-ring forms a gas-tight seal between the vent opening 42 and the support member 28. The support member 28 is maintained in this position by a welded bead 44 which surrounds the flange 34.

Received within the support member 28 is an insert 46 which may be fabricated from plastic or the like. The insert includes an upper reduced diameter portion 48 and a lower enlarged diameter portion 50. The insert 46 includes an annular recess 52 in the portion 50 defined in part by a central circular wall 54 having a height which is less than the height of the outer peripheral wall defining the enlarged portion 50. The insert 46 is provided with an enlarged diameter central bore 56 which communicates with a reduced diameter central bore 58 in the portion 48 and which define a seat 60 at their junction. The outer diameter of the circular insert 46 is sustantially equal to the inner diameter of the support member 26 so that the outer wall of the insert 46 abuts the inner wall of the support member 26. As shown in FIGS. 1 and 2, the support member 26 includes an upper lip portion 62 which is adapted to be crimped over the edge of the enlarged diameter portion 50 of the insert 46 to maintain the insert in place within the support member.

Received between the horizontal surface of the bottom wall 30 of the support member 26 and the lower edge of the insert 46 is a diaphragm designated generally by the reference numeral 64. Since the wall 30 supports the diaphragm, it may thought of as a supporting wall in the support member. The diaphragm is fabricated from a flexible and resilient material such as rubber and includes an upper circular member 66 and a lower sealing member 68. The member 68 includes an outer circular portion 70 connected to a central portion 72 by radial arms 74. Mounted on the upper surface of the member 66 is a cup-shaped member 76 which is retained in place by a centrally located rivet having an enlarged head 78 and which extends through the central portion 72 of the member 68, the upper circular member 66 and the cup-shaped member 76. The cup-shaped member 76 may be fabricated from a metal such as brass. The member 76 is of smaller diameter than the circular member 66. Additionally, the central portion 72 of the lower sealing member 68 is squeezed between the enlarged head 78 of the rivet and the cup-shaped member 76 so that a gas-tight seal is produced thereby. Similarly, the edge of the upper circular member 66 and the circular portion 70 of the lower sealing member 68 are compressed between the horizontal portion of the bottom wall 30 and the lower edge of the enlarged diameter portion 50 of the insert 46 to provide a gas-tight seal therebetween. Accordingly, the gas which exits from the interior of the battery 12 through the vent opening 42 and the bore 36 will be entrapped in the chamber below the diaphragm 64 and will be prevented from entering into the area above the diaphragm.

A slot 80 is provided in the upper reduced diameter portion 48 of the insert 46 and a switch 82 is received therein. A pin 84 extends through aligned bores 86 in the walls defining the upper reduced diameter portion 48 and a bore 88 in the switch 82 to maintain the switch in position. The switch 82 is a normally closed switch and is connected to the charger 22 by leads 90, which are connected to respective upstanding terminals 92 on the switch casing. Accordingly, with the switch normally closed the charger 22 will be energized to charge the battery 12.

However, the switch 82 includes a depending button or armature 94 which, when moved upwardly, causes the switch to open thereby de-energizing the charger 22. A circular or cylindrical member 96 is received in the cup-shaped member 76 and rests on the rivet connecting the member to the diaphragm 64, as shown in FIG. 2. The upper edge of the member abuts the armature 94. Accordingly, if the diaphragm 64 is flexed upwardly the member 96 will likewise move upwardly thereby pushing the armature upwardly to open the switch. However, a biasing device in the form of a spring 98 which abuts the seat 60 at one end and the cup 76 at the other end biases the diaphragm 64 downwardly so that the armature 94 is not moved inwardly under normal conditions thereby maintaining the switch 82 in the closed state so that the charger 22 remains energized.

In operation, under normal conditions when the charger 22 is charging the battery 12 the elements comprising the present invention will be in the positions indicated in FIG. 2. Accordingly, the switch 82 will be in the closed state so that the charger 22 will remain energized and supply charging energy to the battery 12. However, when the battery 12 becomes fully charged there is an increase in the gaseous pressure within the jacket 14 due to the liberation of oxygen. This increase in pressure will be exerted against the underside of the diaphragm 64 through the vent opening 42 and the bore 36 in the support member 26.

As the diaphragm 64 is flexed upwardly due to the increase in gaseous pressure, the member 76 will likewise travel upwardly against the bias of the spring 98. Hence, the member 96 will be carried upwardly thereby exerting an upward force on the armature 94 to open the switch 82. When the switch 82 is moved to the open state the charger 22 becomes de-energized. Accordingly, no more energy will be supplied to the battery. As the battery loses energy the gaseous oxygen again recombines with the chemical elements within the battery to decrease the gaseous pressure within the battery. As the gaseous pressure decreases the force on the diaphragm 64 similarly decreases to that the diaphragm again moves downwardly to its normal position. When the diaphragm reaches its normal position the force on the armature 94 will be removed thereby permitting the armature to move downwardly whereupon the switch 82 closes to energize the charger 22. Thus, charging energy will again be supplied to the battery.

Accordingly, a rechargeable battery power source has been provided which utilizes nickel-cadmium cells or batteries and wherein absolute control over the charging of the batteries is maintained.

A modified embodiment of the invention wherein a different arrangement is utilized to connect the support member with the battery 12 is shown in FIG. 5, it being understood that the remainder of the control device is identical with that shown in FIGS. 1–4. Accordingly, only the differences are shown in FIG. 5.

Thus, the support member 126 of FIG. 5 includes a tapering wall portion 132 having a depending boss 134, a portion of which is threaded at 100 and forms a seat 102 at the junction of the threaded and unthreaded portions. The support member 126 is likewise provided with a bore 36 to permit passage of the fluid or gas from the battery into the interior of the control device.

The threaded portion 100 is threadedly received in a threaded opening 104 in a plate or disc 106 which has a diameter substantially equal to the diameter of the top wall 16 of the battery 12. Compressed between the disc 106 and the top wall 16 of the battery is a resilient O-ring 138 which has a diameter which is smaller than that of the disc. The O-ring 138 and disc 106 are coaxial with the battery so that the passages or bores 36 and 42 are aligned. The O-ring 138 provides a fluid-tight seal between the disc 106 and the battery to prevent any leakage of gas.

A collar 108 maintains the disc 106 in place on the battery. Thus, the collar 108 includes a top wall 101 having an enlarged central aperture 103 through which the support member extends. Additionally, the collar 108 includes a depending peripheral flange 105 which is connected to the battery by either a weld or solder bead 44. The collar 108 operates to center the disc 106 on the battery and to exert a downward force on the disc to compress the O-ring 138.

A nylon washer 107 or the like is compressed between the seat 102 and the disc 106 to provide a fluid-tight seal between the disc and the support member.

When assembling the embodiment shown in FIG. 5, the collar 108 may be pre-tinned to facilitate soldering. The O-ring 138 is placed on the battery and the disc 106 is placed on the O-ring. The collar 108 is then placed on both the disc and the battery. In practice, the diameter of the collar is made slightly smaller than the battery diameter so that the collar must be force-fitted to the battery. Accordingly, the collar is pushed down over the battery a sufficient distance to ensure compression of the O-ring and, while the force is still applied, the collar is soldered (or welded) in place. The washer 107 is then placed on the threaded portion 100 of the support member and the support member is screwed into place until the washer 107 is squeezed between the seat 102 and the disc 106.

What is claimed is:

1. A rechargeable battery power source comprising a battery of a type adapted to produce an increased gaseous pressure when the battery is fully charged; said battery including a cylindrical jacket having top and bottom walls; control means adapted to be connected to a battery charging device for controlling the operation of said device to prevent overcharging of said battery; sealing means for sealingly connecting said control means to said top wall of said battery jacket; said control means comprising a housing having a movable pressure-responsive flexible and resilient insulating diaphragm therein, a switch operable between a closed position for energizing the charging device and an open position for deenergizing the charging device, connecting means for connecting said switch with said diaphragm for moving said switch to the open position in response to movement of said diaphragm in a first direction, and a passage extending through said battery jacket and said housing connecting the interior of said battery with said diaphragm so that increased gaseous pressure within said jacket moves said diaphragm in said first direction to cause deenergization of the charging device; said diaphragm normally residing in a second position corresponding to the closed position of said switch, and being adapted to be moved in said first direction to a first position by said increased gaseous pressure to cause said switch to move to the open position, said diaphragm including a cup-shaped member connected with said switch, a seat in said housing, a spring in said housing abutting said seat at one end and said cup-shaped member at the other end to normally bias said diaphragm to the second position whereby said switch is moved to the closed position, said diaphragm further including an outer peripheral portion, said housing further comprising a support member having a support wall for supporting said outer peripheral portion of said diaphragm, said passage comprising a vent opening in said top wall of said battery and a bore in said support member to provide for the communication of said increased gaseous pressure with said diaphragm, said sealing means comprising a disc threadedly engaged with said support member, and a compressible O-ring compressed between said disc and said battery top wall and surrounding said vent and said bore.

2. A rechargeable battery power source as in claim 1, in which said sealing means further comprises a collar surrounding said disc and exerting a force on said disc in a direction to compress said O-ring, and means for connecting said collar to said battery.

3. A rechargeable battery power source as in claim 2, and means for sealing said support member to said disc in a gas-tight seal.

* * * * *